United States Patent [19]

Komorizono et al.

[11] Patent Number: 4,489,556

[45] Date of Patent: Dec. 25, 1984

[54] TANDEM BRAKE MASTER CYLINDER

[75] Inventors: Junichi Komorizono; Akihiko Miwa, both of Toyota, Japan

[73] Assignee: Aisin Seiki Kabushiki Kaisha, Kariya, Japan

[21] Appl. No.: 480,867

[22] Filed: Mar. 31, 1983

[30] Foreign Application Priority Data

Apr. 6, 1982 [JP] Japan .................. 57-049839[U]

[51] Int. Cl.³ .............................................. F15B 7/00
[52] U.S. Cl. ........................................ 60/585; 92/146; 92/161
[58] Field of Search ................ 60/562, 585, 588, 592; 285/137 R, 61; 92/146, 161; 138/111, 115, 116

[56] References Cited

U.S. PATENT DOCUMENTS

| | | | |
|---|---|---|---|
| 2,475,468 | 7/1949 | Andrews | 285/137 R |
| 3,799,588 | 4/1974 | Green | 285/158 |
| 3,874,710 | 4/1975 | Courtot | 285/137 R |
| 4,337,792 | 7/1982 | Nomura | 60/592 |
| 4,385,495 | 5/1983 | Kubota | 60/592 |

FOREIGN PATENT DOCUMENTS

| | | | |
|---|---|---|---|
| 2517282 | 11/1975 | Fed. Rep. of Germany | 60/562 |
| 1439170 | 6/1976 | United Kingdom | 285/137 R |

Primary Examiner—Robert E. Garrett
Assistant Examiner—Scott L. Moritz
Attorney, Agent, or Firm—Oblon, Fisher, Spivak, McClelland & Maier

[57] ABSTRACT

A tandem brake master cylinder which includes a single inlet union having two inlet union portions which are connected to each other as a single, unitary body via a connecting portion, the connecting portion having at approximately a central portion thereof a mounting portion which projects toward a cylinder body and which has an insertion hole formed therein. The distance between each inlet union and a common mounting screw may be double that as compared with the distance between the inlet union and its associated mounting screw in conventional master cylinders and therefore the play of the inlet union portions may be greatly reduced.

9 Claims, 2 Drawing Figures

TANDEM BRAKE MASTER CYLINDER

BACKGROUND OF THE INVENTION

1. Field of the Invention

This invention relates to brake master cylinders for vehicles and more particularly to an inlet union of tandem brake master cylinder in which dual brake fluid pressures are applied independently of each other to sets of wheel brake cylinders.

2. Description of the Prior Art

Conventionally, various tandem brake master cylinders have been proposed which include two inlet unions which are, in turn, connected by means of hoses to a tandem reservoir secured to a vehicle body. The two inlet unions are attached to a cylinder body of the master cylinder and may be molded of resinous material such as nylon in order to reduce weight and cost. Each inlet union has a tubular portion which is inserted within an inner wall of a boss provided on the cylinder body, a further tubular portion which is inserted within one end of the hose, and a mounting flange which has two insertion holes for mounting screws so as to face the top of the boss. Thus, each inlet union is mounted on the cylinder body by means of the mounting screws which are threaded therethrough. In a case where the mounting flange is tightened too much by means of the mounting screws, there is the possibility that the mounting flange will be cracked. In order to avoid this possibility of cracking, the diameter of the mounting screw has been set so as to be less than that of the insertion hole and the length of large diameter shaft portion of the mounting screw has been set so as to be greater than the thickness of the mounting flange. Moreover, such play in the inlet unions may be relatively large due to the clearances between the insertion hole and the mounting screw and between the mounting flange and the top of the boss of cylinder body. Therefore, the sealing function of the sealing members which are positioned between the inlet unions and the bosses of the cylinder body may be damaged, especially since the inlet unions are caused to be moved in assembly of a vehicle and in maintenance of and repair work on the vehicle. Moreover, inlet unions may develop play due to vibration during vehicle running.

SUMMARY OF THE INVENTION

It is, therefore, an object of the present invention to provide a new and improved tandem brake master cylinder which obviates the above-mentioned prior art drawbacks.

It is a further object of the present invention to provide a new and improved tandem brake master cylinder in which the play of an inlet union may be minimized.

It is still another object of the present invention to provide a new and improved tandem brake master cylinder which is simple in construction and low in cost.

A tandem brake master cylinder according to the present invention comprises a single inlet union having two inlet union portions which are connected to each other as a single, unitary body by means of a connecting portion, the connecting portion having at approximately a central portion thereof a mounting portion which projects toward a cylinder body and which has an insertion hole formed therein. The distance between each inlet union and a common mounting screw may be double that as compared with the distance between the inlet union and its associated mounting screw in the prior art master cylinder and therefore the play of the inlet union portions may be greatly reduced.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENT

Figure 1:
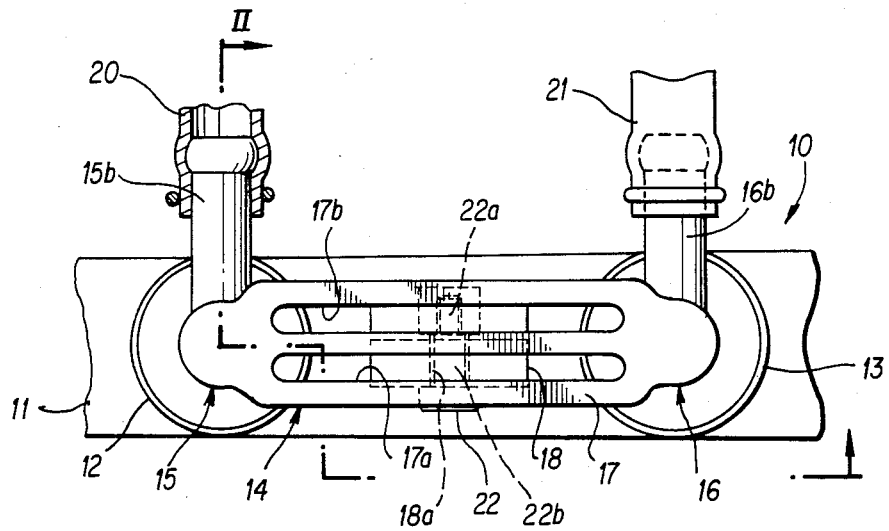
FIG. 1 is a plan view of a tandem brake master cylinder according to the present invention.

Referring now to the drawings, a tandem brake master cylinder 10 is shown which has a cylinder body 11 which has in turn first and second bosses 12 and 13 to thereby supply brake fluid to two pressure chambers within the cylinder body 11. An inlet union 14 molded of nylon or resinous material has a first inlet union portion 15, a second inlet union portion 16, a connecting portion 17 and a mounting portion 18 as formed on a single, unitary body.

The first inlet union portion 15 has a first tubular portion 15a which is positioned through means of an annular sealing member 19 within an inner wall 12a of the boss 12, a second tubular portion 15b which is inserted within one end of a hose 20. The other end of the hose 20 is fluidically connected to a reservoir (not shown). The construction of the second inlet union portion 16 is substantially the same as that of the first inlet union portion 15 and therefore the details thereof are omitted in the drawings.

Figure 2:
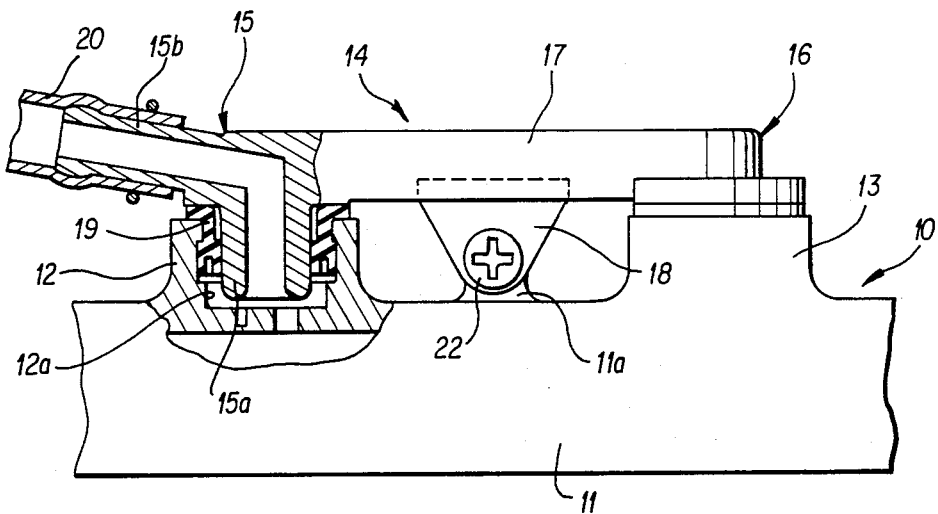
FIG. 2 is a cross-sectional view of a part of the tandem brake master cylinder taken along line II—II of FIG. 1.

In communicating air out of the master cylinder by means of supplying pressurized fluid from the tubular portions 15b and 16b, each of the inlet union portions 15 and 16 has an upwardly directed force applied to it as per the orientation shown in FIG. 2. In positioning the tubular portions 15b and 16b within the hoses 20 and 21, each inlet union portion 15 and 16 has a force applied to it in an upward and downward direction in FIG. 1. Therefore, it is necessary that the rigidity of the connecting portion 17 be such as to resist these forces or loads. In order to have the required bending rigidity of the connecting portion 17 in spite of its light weight, the connecting portion 17 has first and second, parallelly oriented elongated holes 17a and 17b formed therein. Due to the arrangement of the elongated holes 17a and 17b, in molding the inlet union 14, cooling of each part of the connecting portion 17 may be unified and no shrinkage is allowed to occur in the connecting portion 17.

The mounting portion 18 has an insertion hole 18a formed therein which receives a mounting screw 22 positioned in a transverse direction of the cylinder body 11, namely in the vertical direction in FIG. 1. The mounting screw 22 is stepped and the small diameter male portion 22a thereof is threaded through a mounting portion 11a of the cylinder body 11.

The diameter of a large diameter shaft portion 22b of the mounting screw 22 is smaller than that of the insertion hole 18a and the length of portion 22b of screw 22 is larger than the thickness of the mounting portion 18 and therefore, the mounting portion 18 may not be too greatly tightened by means of the mounting screw 22. A plurality of such insertion holes 18a and screws 22 may be provided.

While a preferred embodiment of the invention has been described, it will be readily apparent to those skilled in the art that various changes and arrangements can be made to accomplish the objects of the invention without departing from the scope and spirit of the appended claims.

What is claimed as new and desired to be secured by Letters Patent of the United States is:

1. A tandem brake master cylinder having a reservoir and comprising:

a cylinder body having a first and second boss;

inlet means operatively associated with said body and made of resinous material and which further comprises a first and second inlet portion, a connecting portion interconnecting said first and second inlet portions as single unitary body, and a mounting portion which projects from an approximately central portion of said inlet means toward said cylinder body, said mounting portion having at least one hole formed therein in a transverse direction of said cylinder body, wherein each of said first and second inlet portions further comprises a sealing member mounted on said body, a first tubular portion which is positioned within said sealing member and within an inner wall portion of one of said first and second bosses and a second tubular portion;

a hose connected to said second tubular portion and in communication with said reservoir; and means disposed in said at least one hole in said mounting portion for mounting said inlet means to said body.

2. A tandem brake master cylinder as set forth in claim 1, wherein said connecting portion has at least one elongate hole formed therein so as to have a predetermined bending rigidity.

3. A tandem brake master cylinder as set forth in claim 1, wherein said mounting means further comprises a screw having a large diameter shaft portion a diameter of which is less than that of said hole in said mounting portion and a length of which is greater than the thickness of said mounting portion.

4. A tandem brake master cylinder as set forth in claim 1, wherein said connecting portion has at least one elongate hole formed therein so as to have a predetermined bending rigidity and wherein said mounting means further comprises a screw having a large diameter shaft portion, a diameter of which is less than that of said hole in said mounting portion and a length of which is greater than the thickness of said mounting portion.

5. A tandem brake master cylinder as set forth in claim 2, wherein said at least one elongate hole in said connecting portion further comprise a first and second elongate hole.

6. A tandem brake master cylinder as set forth in claim 4, wherein said at least one elongate hole in said connecting portion further comprise a first and second elongate hole.

7. A tandem brake master cylinder as set forth in claim 5, wherein said first and second elongate holes are parellelly oriented.

8. A tandem brake master cylinder as set forth in claim 6, wherein said first and second elongate holes are parallelly oriented.

9. A tandem brake master cylinder as set forth in claim 1, wherein said at least one hole in said mounting portion further comprises a plurality of holes.

* * * * *